United States Patent
Rhee

(10) Patent No.: US 7,586,986 B2
(45) Date of Patent: Sep. 8, 2009

(54) SYSTEM DECODER OF DIGITAL TV

(75) Inventor: Seung Hyeon Rhee, Seoul (KR)

(73) Assignee: LG Electronics Inc., Seoul (KR)

(*) Notice: Subject to any disclaimer, the term of this patent is extended or adjusted under 35 U.S.C. 154(b) by 955 days.

(21) Appl. No.: 11/058,679

(22) Filed: Feb. 14, 2005

(65) Prior Publication Data
US 2005/0180452 A1 Aug. 18, 2005

(30) Foreign Application Priority Data
Feb. 13, 2004 (KR) .................. 10-2004-0009643

(51) Int. Cl.
*H04N 7/12* (2006.01)
(52) U.S. Cl. ............. 375/240.26; 375/240; 375/240.01; 375/240.25
(58) Field of Classification Search ............... 375/240, 375/240.01, 240.08, 240.25, 240.26, 240.12
See application file for complete search history.

(56) References Cited

U.S. PATENT DOCUMENTS 6,968,006 B1 * 11/2005 Puri et al. ............. 375/240.08

* cited by examiner

*Primary Examiner*—Allen Wong
(74) *Attorney, Agent, or Firm*—Lee, Hong, Degerman, Kang & Waimey

(57) ABSTRACT

Disclosed is a system decoder of a digital TV. Particularly, the system decoder brings about the effect of remultiplexing packet data input from different channels by giving an ID to each channel, using it as an extension field of a packet ID (PID) and an extension field of a table ID of a section that are defined in the ISO/IEC 13818-1, and storing the channel ID information in the buffer transmitting packets and outputting them. Further, a memory allocated to each component can be operated without channel discrimination through the extension fields and the remultiplexing effect. Moreover, it is possible to minimize the time and cost taken to modify hardware and software so as to apply a PID filter or the like designed in a single channel to a decoder ASIC supporting a plurality of channels.

23 Claims, 10 Drawing Sheets

FIG. 10
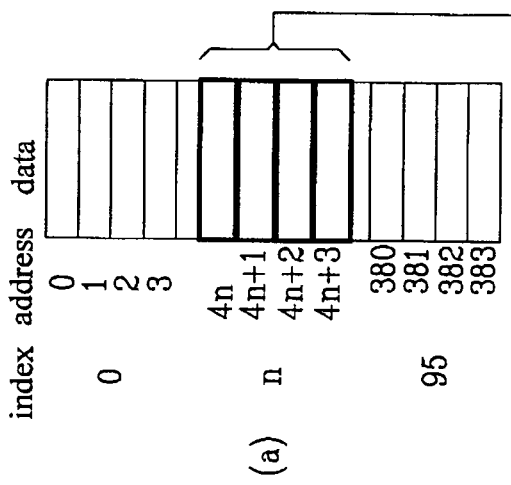
(a)
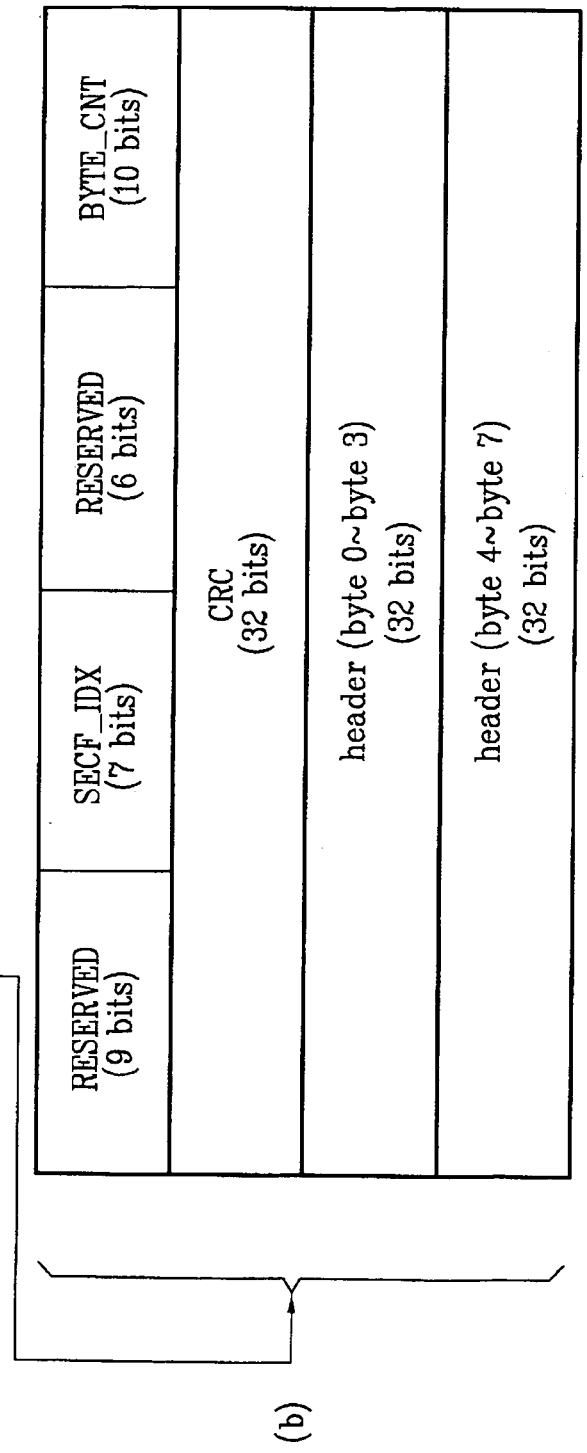
(b)

SYSTEM DECODER OF DIGITAL TV

This application claims the benefit of the Korean Patent Application No. 10-2004-0009643, filed on Feb. 13, 2004, which is hereby incorporated by reference as if fully set forth herein.

BACKGROUND OF THE INVENTION

1. Field of the Invention

The present invention relates to a digital TV, and more particularly, to a system decoder which performs PID filtering and section filtering by remultiplexing signals from a plurality of input channels.

2. Background of the Related Art

With the expansion of digital TV broadcasting, the demand for multichannels is increasing. In particular, as services become diversified into ground wave, satellite, cable, etc. and the expansion of functions of, for example, a PVR (Personal Video Recorder), the necessity of simultaneously processing more than two channels is rapidly increasing. In order to simultaneously process a plurality of channels, first of all, the performance of an ASIC for processing them has to be improved proportionately. Especially, not merely in terms of processing speed, but in order to process simultaneously input channel data, a great deal of components have to be operable in parallel.

One of the simplest system decoders for simultaneously processing three channels realizes every component for processing each channel in three sets 10, 30 and 50 as shown in FIG. 1. At this point, the internal constitution of each system decoder is all the same.

As one example, the first system decoder 10 largely includes a PDI filter 12, a descrambler 14, a section filter 16, and an audio/video demultiplexer 20. And, a buffer is used as necessary between the components, and data processed in each of the steps is stored in a corresponding buffer and then transmitted to the next step. In FIG. 1, buffers 11 and 15 are provided at the front end of the PID filter and between the descrambler and the section filter.

FIG. 2 shows a packet buffer structure for storing each transport packet of 188 bytes defined in the ISO/IEC 13818-1.

Further, each of the system decoders requires a decoder for extracting information needed for the header of a packet. In FIG. 1, the PID filter 12 and the section filter 16 each have a decoder.

A filter memory 13 is connected to the PID filter 12, and the codes applicable for a transport packet having a specific PID are set for the filter memory 13. That is, when a packet of channel A is input into the PID filter 12 through the buffer 11, the PID filter sequentially reads the value of the filter memory 13 to make comparison if there is an address having the same PID field as the PID of a packet currently in process. If there is a matching address, the packet is processed as defined in the values of the rest of the fields set for the corresponding address.

FIG. 3 shows one example of a PID filter memory providing 32 words per channel. That is, as shown in FIG. 3(a), a 32-word PID filter memory is allocated to three channels A, B and C, respectively, and each word has 32 bits.

FIG. 3(b) shows the configuration of the fields of a given word (n) of the PID filter memory, i.e., the configuration of the fields of each address. Among the fields stored in each address, EN of 1-bit is for determining whether to apply settings of the corresponding address, and PID field of 13-bits represents a PID of a packet which the settings of the corresponding address is to be applied to. TYPE field represents whether data of a packet having the PID set for the corresponding address is a section type or PES type.

If data of the packet is a section type, low-order fields operate by 5-bit SECF_L_BND and 5-bit SECF_U_BND. These fields set a lower boundary and an upper boundary when sequentially searching a section filter. This increases an operating speed of the section filter by limiting the range of the section filter to be searched to parts.

Meanwhile if data of the packet is a PES type, lower fields operate by OPORT and OBUF. If OPORT_EN field is 1, the packet having the PID set for the corresponding address is output to a port set for OPORT field. Further, if OBUF_EN field is 1, the packet having the PID set for the corresponding address is stored in the buffer set for the OBUF field of 5-bits. This buffer is located in the memory connected to the outside of an ASIC.

In the example of FIG. 3, 3 bits and 5 bits are allocated to OPORT and OBUF so as to be able to select 8 output ports and 32 external memory buffers.

Each of the fields of the PID filter memory as described above are set by software and the PID filter processes a packet according to the settings therefore. For example, among the PID filter memory 13 of channel A, if EN field is set to 1, PID field is set to 31 h, OBUF_EN file ○] is set to 1 and OBUF field is set to 4, one of the packets that has a PID of 31 h input into channel A is stored in a fifth buffer (buffer 4) set to an external memory.

Meanwhile, the section filter also operates in a similar way to the PID filter, and an example of a section filter memory is shown in FIG. 4. That is, if a condition is set for a filter memory allocating 32 indexes per channel, in a case a packet in processing includes a section, the section filter determines whether to take data or not by comparing the value set for the filter memory and the contents of the packet in processing. The section filter memory allocating a 64-word memory for each of three channels A, B and C as shown in FIG. 4(a), each word having 32-bits. At this point, two words form one index. FIG. 4(b) shows the configuration of fields of a given index (n) in the section filter memory.

The fields stored in each index are all selected from the fields of a section header defined in a section data structure in the ISO/IEC 13818-1. In the example of FIG. 4(b), six fields including TBL_ID, SSI, PI, VER_NUM, SEC_NUM, and TSI are used, each of them corresponding to table_id, section_syntax_indicator, private_indicator, version_number, section_number, and transport_stream_id. The MASK filed is a 6-bit mask value for setting whether to use each of these six fields or not. The 5-bit OBUF field designates a buffer for storing a section satisfying the condition.

In the example of FIG. 4, as in the OBUF field of the PID filter memory, one of 32 buffers set for the memory connected to the outside of the ASIC.

At this point, the buffers used for data storage in the PID filter and section filter are all set for the memory connected to the outside of the ASIC. For setting the size and position of these buffers, a register is required, and a buffer setting memory 18 of FIG. 1 plays the role of the register.

In the example of FIG. 1, since 32 buffers are allocated per channel, the buffer setting memory 18 also requires 32 regions per channel.

Additionally, the section filter requires a state memory 19 for helping the operations of the section filter and decoder besides the section filter memory.

At this point, since two consecutive packets having the same PID may share one section, the state memory 19 is give for each PID, i.e., for each PID filter. In other words, in a case that a section does not finish at the end of a packet but goes on to the next packet having the same PID, a packet having a different PID may come between the two packets. Hence, in order to normally process the section included in the latter packet, the section filter has to be initiated to a proper state, i.e., a state right after processing the packet having the same PID recently. At this time, the values for this initiation are stored in the state memory 19. Such similar state information is managed not only in the section filter but also in other decoding processes.

FIG. 5 shows an example of a state memory for storing a state during a section processing for three channels. The state memory has a 128-word memory for each of three channels A, B, and C as shown in FIG. 5(a), each word having 32 bits. At this point, for words form one index. FIG. 5(b) shows the configuration of fields of a given index (n) in the state memory.

At this time, SECF_IDX field among the fields stored in each index stores the index of a section filter having to process a section including a packet having a corresponding PID. BYTE_CNT field stores a number of bytes processed of a section header or data. Based on this value, the position in the previous packet where processing is stopped, i.e., the position in the entire section where the header or data to be processed in the current packet occupies can be known. CRC field stores the hitherto-calculated value of a CRC of the section in processing, and header field stores a 8-byte header of the section in processing.

By the way, in case the header of the section is stopped at the end of the packet, since the portion continuing in the next packet has no information, such as a table ID or the like, it is impossible to find a proper section filter. This problem can be solved by using SECF_IDX field and the header information after storing them as shown in FIG. 5. This state information is provided for the case that a section is sent in two packets. Since this case does not occur more than twice for one PID, one unit of state information is allocated per PID filter. FIG. 5 shows an example of 32 PID filters being provided for each channel.

As described above, the structure of FIG. 1 is constructed of three independently operable complete system decoders. Thus, the processing of a plurality of channels utilizing system decoders as shown in FIG. 1 has no great difficulty in realization because it is possible to start the processing from a single channel decoder. But, the system decoders of FIG. 1 has a drawback that they are inefficient in terms of manufacturing cost because each of them has no less than three components unnecessary according to circumstances or redundant.

The system decoder is divided into the parts where each of the components plays a certain role and may have some parts that are not used at all according to application fields. Thus it is not preferable to redundantly realize the entire components.

SUMMARY OF THE INVENTION

Accordingly, the present invention is directed to a lighting optical system that substantially obviates one or more problems due to limitations and disadvantages of the related art.

An object of the present invention is to provide a system decoder of a digital TV which shares the components of the system decoder processing multichannels to simultaneously process data sent from the multichannels.

Another object of the present invention is to provide a system decoder of a digital TV which minimizes the parts changeable according to the extension of a number of input channels in the system decoder processing multichannels.

Still another object of the present invention is to provide a system decoder of a digital TV which is able to allocate a memory source to each channel not in a fixed manner but in a variable manner.

To achieve these objects, there is provided a system decoder of a digital TV according to the present invention, which gives an ID to each channel, and uses it as an extension field of a packet ID (PID) and an extension field of a table ID of a section that are defined in the ISO/IEC 13818-1, The system decoder of a digital TV according to the present invention realized by hardware comprises: a buffer unit having packet buffers by channel, each of the packet buffers storing a channel ID along with packet data of a corresponding channel and then time-sharing the contents of the packet buffer and outputting the same; a PID processing unit consisting of one PID filter shared by a plurality of channels and a PID filter memory freely allocable and available by each channel without channel discrimination within the limit of the entire memory capacity, and forming an extension PID field from a PID filed and channel ID of a packet output from the buffer unit, comparing the same with extension PID fields set for the PID filter memory and if there is a matching extension PID field, processing the input packet as defined for the values of the rest of the fields set for a corresponding address; a section processing unit consisting of one section filter shared by a plurality of channels and a section filter memory freely allocable and available by each channel without channel discrimination within the limit of the entire memory capacity, and if a packet output from the PID processing unit and in processing contains a section, determining whether to take the input packet or not by comparing an extension table ID field set for the section filter memory and an extension table ID of the packet in processing; and one A/V demultiplexer shared by a plurality of channels, and dividing the packet output from the section processing unit by channel and then dividing the packet of each channel into an audio packet and a video packet and outputting the same.

The packet data of an input channel, the ID of the channel and the data type information thereof are stored in each packet buffer of the buffer unit, to thereby bring about the effect of remultiplexing packet data input from different channels.

After extending the back portion of each packet buffer of the buffer unit, 188-bytes effective packet is stored and then a channel ID and data type information are stored in the extended portion.

Especially, in the present invention, a memory allocated to each component is operated without channel discrimination through the extension PID field, extension table ID field and remultiplexing effect.

Additional advantages, objects, and features of the invention will become apparent in the detailed description of the embodiments with reference to the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10(a) is a view showing an example of a state memory without channel discrimination of the system decoder according to the present invention; and FIG. 10(b) is a view showing the configuration of the fields of a given index (n) of the state memory of FIG. 10(a).

DETAILED DESCRIPTION OF THE PREFERRED EMBODIMENTS

Figure 1:
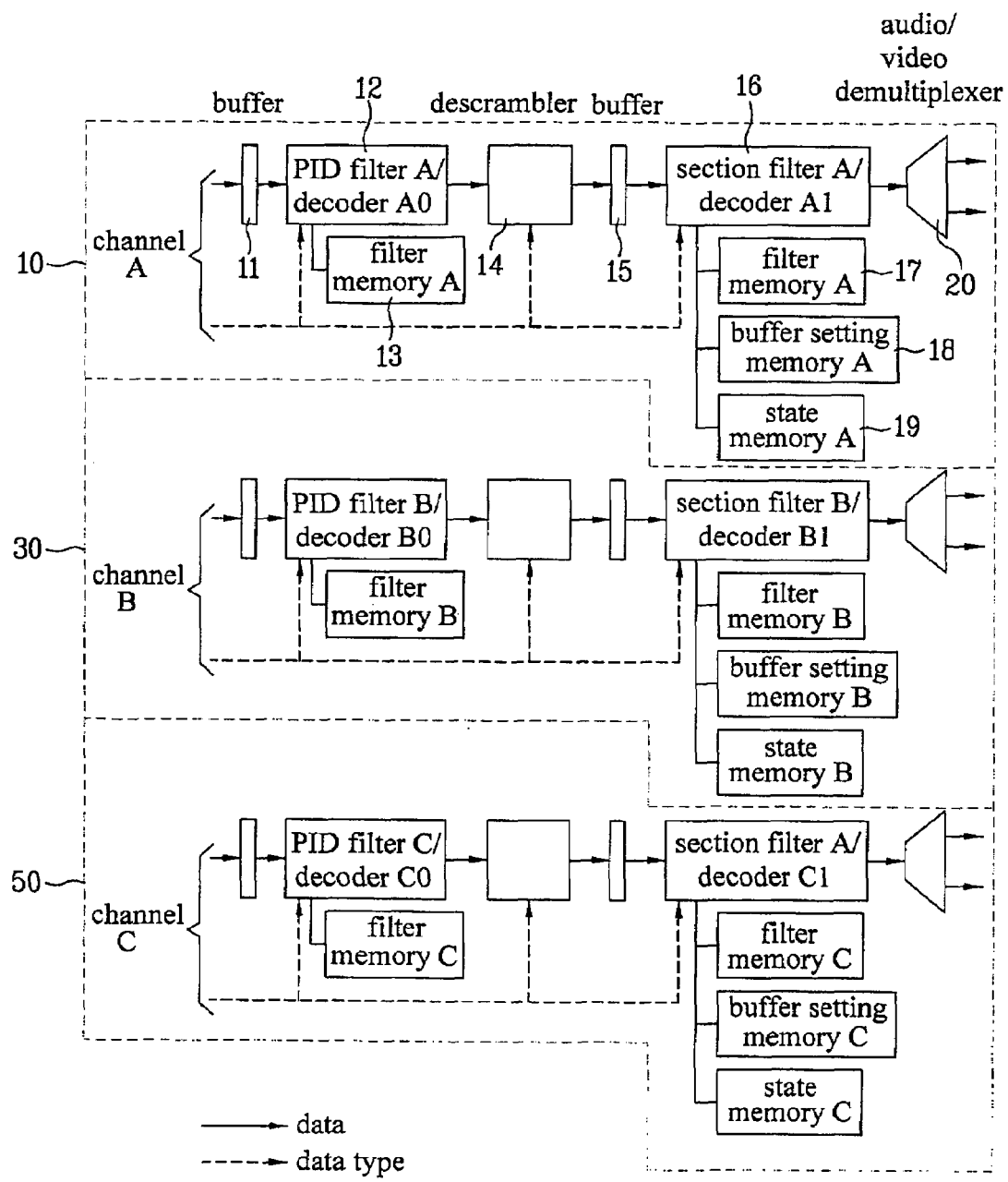
FIG. 1 is a block diagram showing one example of a conventional system decoder.
Figure 2:
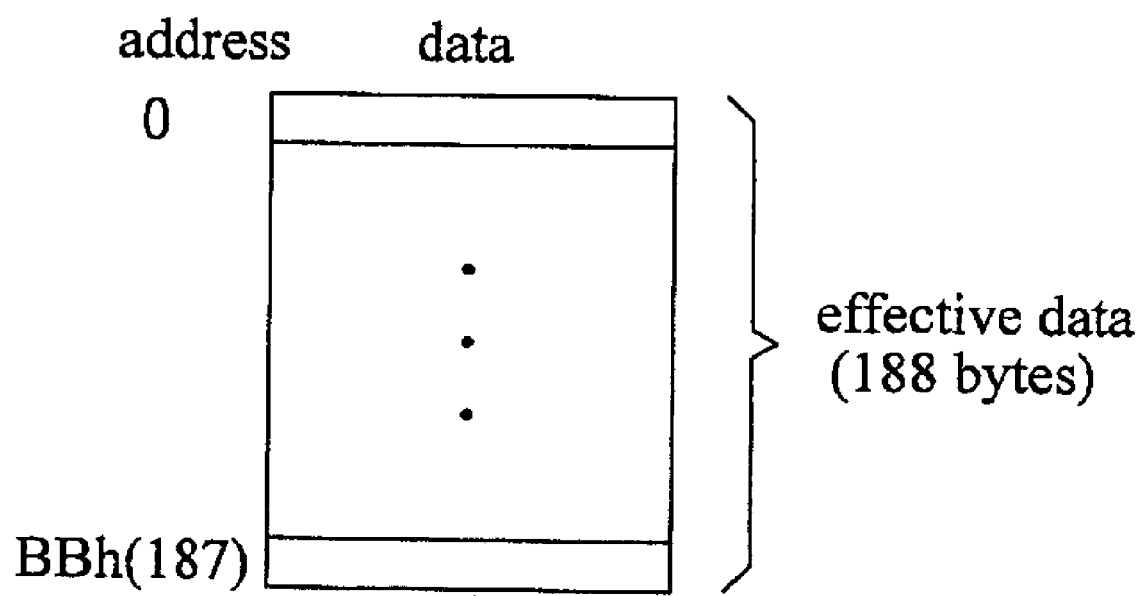
FIG. 2 is a view showing a structure of a packet buffer of FIG. 1.

Hereinafter, the configuration and operation of preferred embodiments of the present invention will be described with reference to the accompanying drawings. The configuration and operation of the present invention illustrated and explained in the drawings are explained by way of at least one embodiment. Therefore, the technical idea, core configuration and operation of the present invention are not limited thereto.

Figure 6:
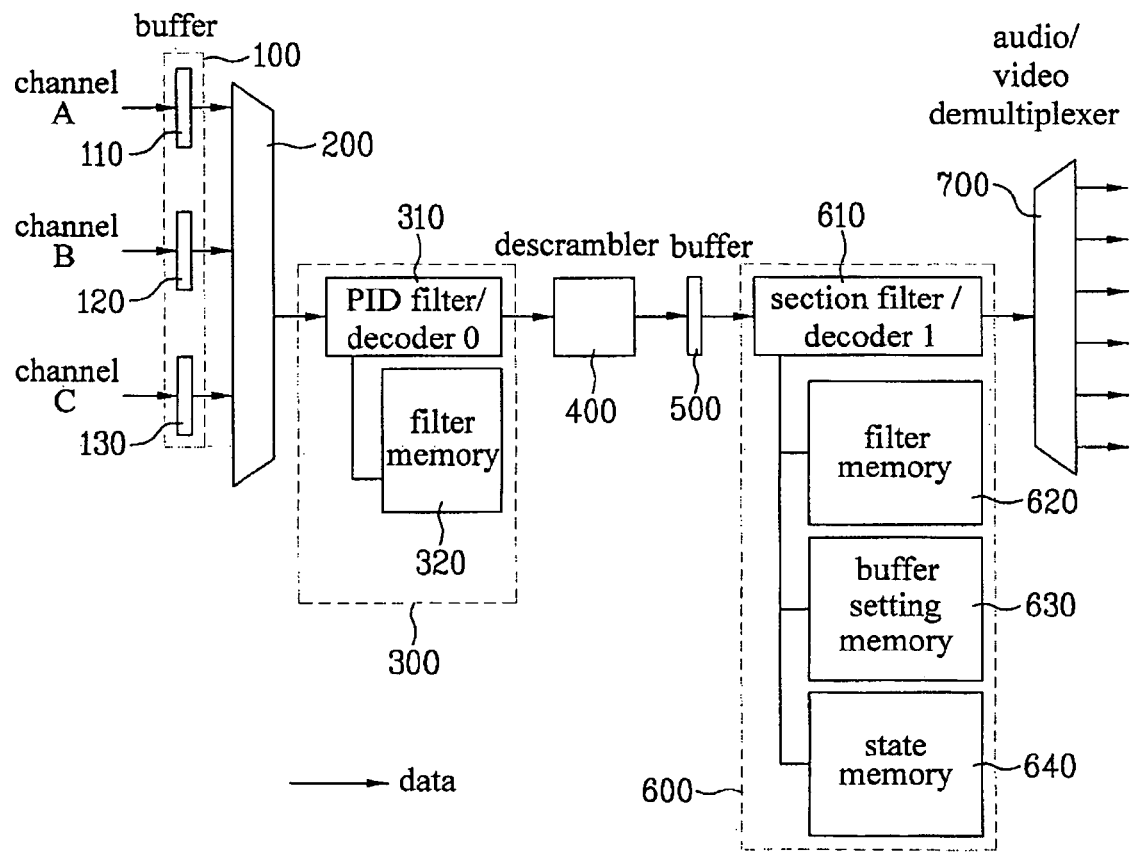
FIG. 6 is a block diagram showing one embodiment of a system decoder according to the present invention.

FIG. 6 is a block diagram of system decoders according to the present invention. A PID filter 310, a descrambler 400, a section filter 610, an A/V demultiplexer 700, a PID filter memory 320, a section filter memory 620, a buffer setting memory 630, and a state memory 640 are all shared by a plurality of input channels, to perform processing.

In FIG. 6, for the convenience of description, reference numeral 300 denotes a PID processing unit, and 600 denotes a section processing unit. The PID processing unit 300 includes a PID filter/decoder 310 and a PID filter memory 320. The section processing unit 600 includes a section filter/decoder 610, a section filter memory 620, a buffer setting memory 630, and a state memory 640. The plurality of input channels A, B, and C are input into a MUX 200 through corresponding packet buffers 110, 120 and 130 of a buffer unit 100, and time-shared in the MUX 200 to be output to the PID filter/decoder 310 of the PID processing unit 300.

In the present invention thus configured, firstly, an ID is given for each channel input into the system decoder, and used as an extension field of a transport packet ID (PID) defined in the ISO/IEC 13818-1. That is, the extension PID field contains a packet ID and a channel ID.

Figure 7:
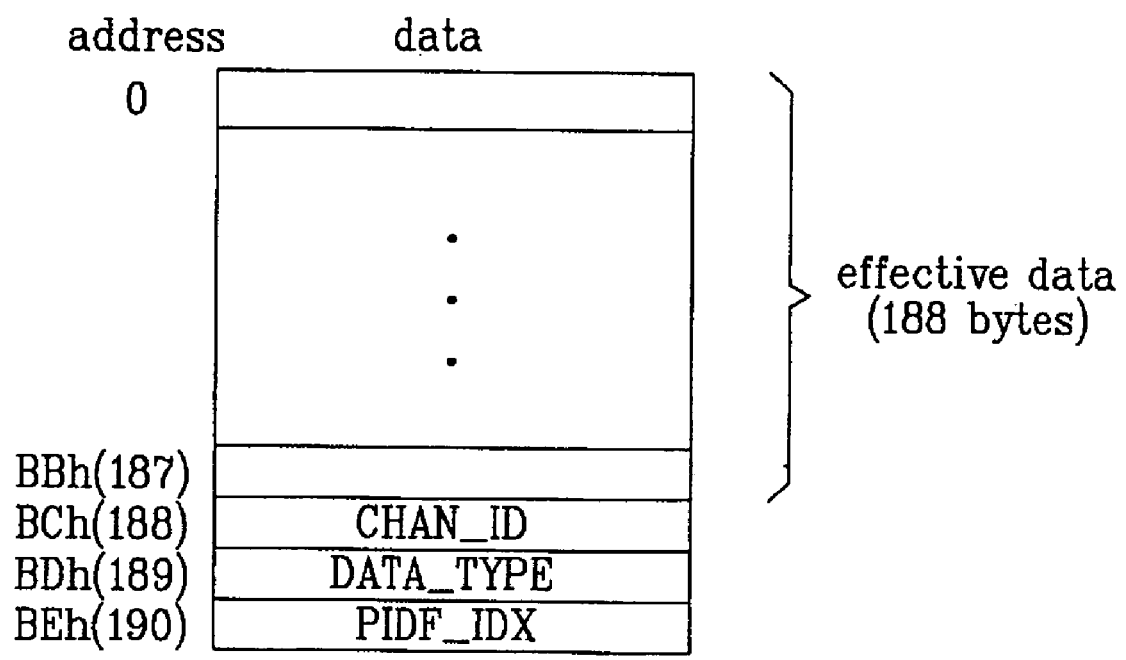
FIG. 7 is a view showing the structure of a packet buffer of FIG. 6.

As shown in FIG. 7, when packet data of a specific channel is input into each packet buffer of the buffer unit 100, a corresponding channel ID (CHAN_ID) is stored in the packet buffer along with the packet data of the specific channel. By this, it becomes possible for each block to simply read and process the contents of the packet buffer. For instance, in case that packet data of channel A is input into the packet buffer 110 of the buffer unit 100, a channel ID representing channel A is stored in the packet buffer 110 along with packet data corresponding to channel A.

Also, a data type (DATA_TYPE) is stored in each packet buffer, to reduce signals required for transmission between the components. After each packet has passed through the PID filter, the information on what number of a PID filter the packet has passed through is still required in the subsequent stage, let alone the PID value. This value (PIDF_IDX) is also inserted into the end of the packet buffer.

In other words, in the present invention, the information (for example, channel ID, data type, etc.) that is generated in each stage and has to be transmitted to the next stage is stored in the packet buffer, and this has an advantage in reutilization because this information can be preserved without modifying the interface between the components when it is desired to modify the operating manner of each component or add functions in the future.

This information is allocated to the back portion of the packet buffer, rather than the front portion thereof, so as to make it easier to change the structure in the method proposed in the present invention by maintaining a conventional packet buffer structure to the utmost extent.

In this way, data (i.e., effective packet data, channel ID, data type, and PIDF_IDX) stored in each of the packet buffers 110, 120 and 130 of the buffer unit 100 is time-shared from the MUX 200 and output to the PID filter/decoder 310 of the PID processing unit 300.

The PID filter/decoder 310 compares an extension PID value of a packet input when implementing PID filtering for an input packet and an extension PID value set for the PID filter memory 320 by software. The extension PID value of the input packet includes the PID field and channel ID of the input packet:

In other words, the PID filter/decoder 310 produces an extension PID field by attaching CHAN_ID (channel ID) in front of the most significant bit (MSB) of a PID field defined in the ISO/IEC 13818-1 when extracting the PID field of an input packet through the MUX 200.

Figure 8:
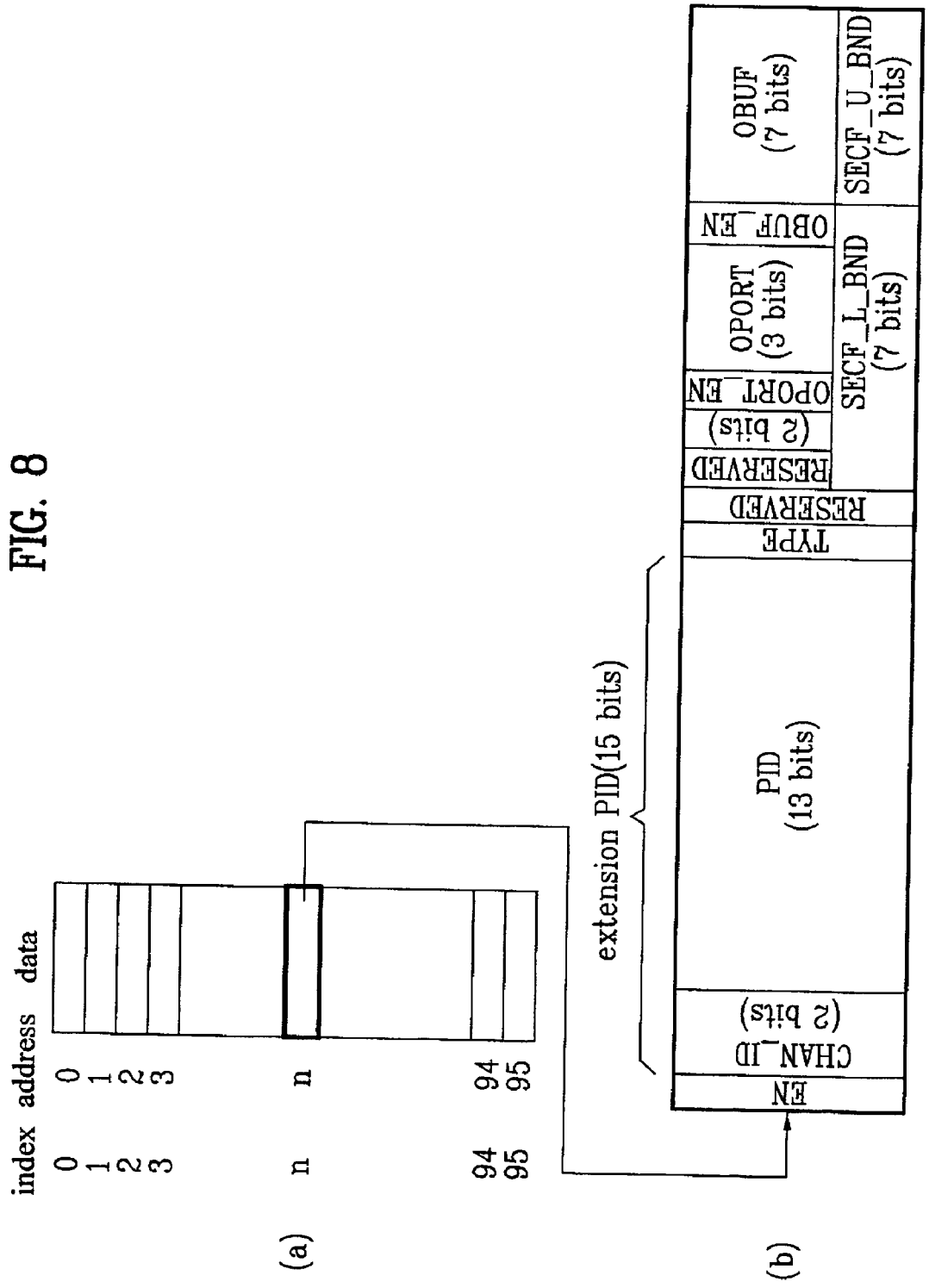
FIG. 8(a) is a view showing an example of a PID filter memory without channel discrimination in the system decoder according to the present invention.
FIG. 8(b) is a view showing the configuration of the fields of a given word (n) of the PID filter memory of FIG. 8(a)

At this point, the extension PID field of the PID filter memory 320 consists of channel ID (CHAN_ID) and PID fields as shown in FIG. 8. That is, as shown in FIG. 8, the channel ILD field is allocated to an unused region between an existing EN field and the PID field.

Further, in the structure of the present invention, a memory is allocated per channel not in a fixed manner but in a flexible manner according to circumstances.

Figure 4:
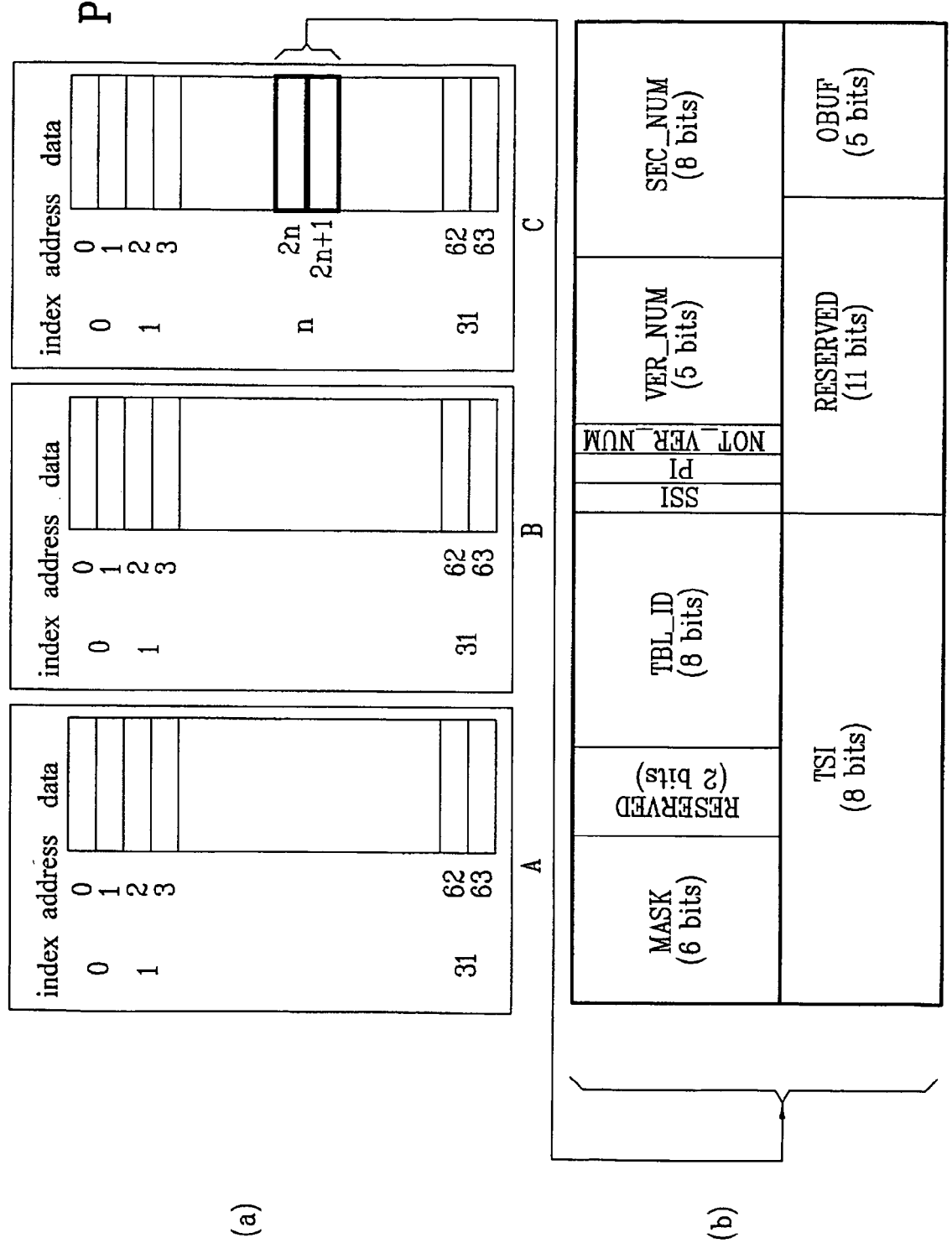
FIG. 4(a) is a view showing an example of a section filter memory of FIG. 1 providing 32 words per channel.
FIG. 4(b) is a view showing the configuration of the fields of a given index (n) of the section filter memory of FIG. 4(a)

In other words, in the conventional method as shown in FIG. 4, memory regions are allocated in units of channels, while, in the present invention, a channel can be designated for every element settable for a memory. Thus, a memory region can be freely allocated within the limit of the entire memory capacity when necessary.

Figure 3:
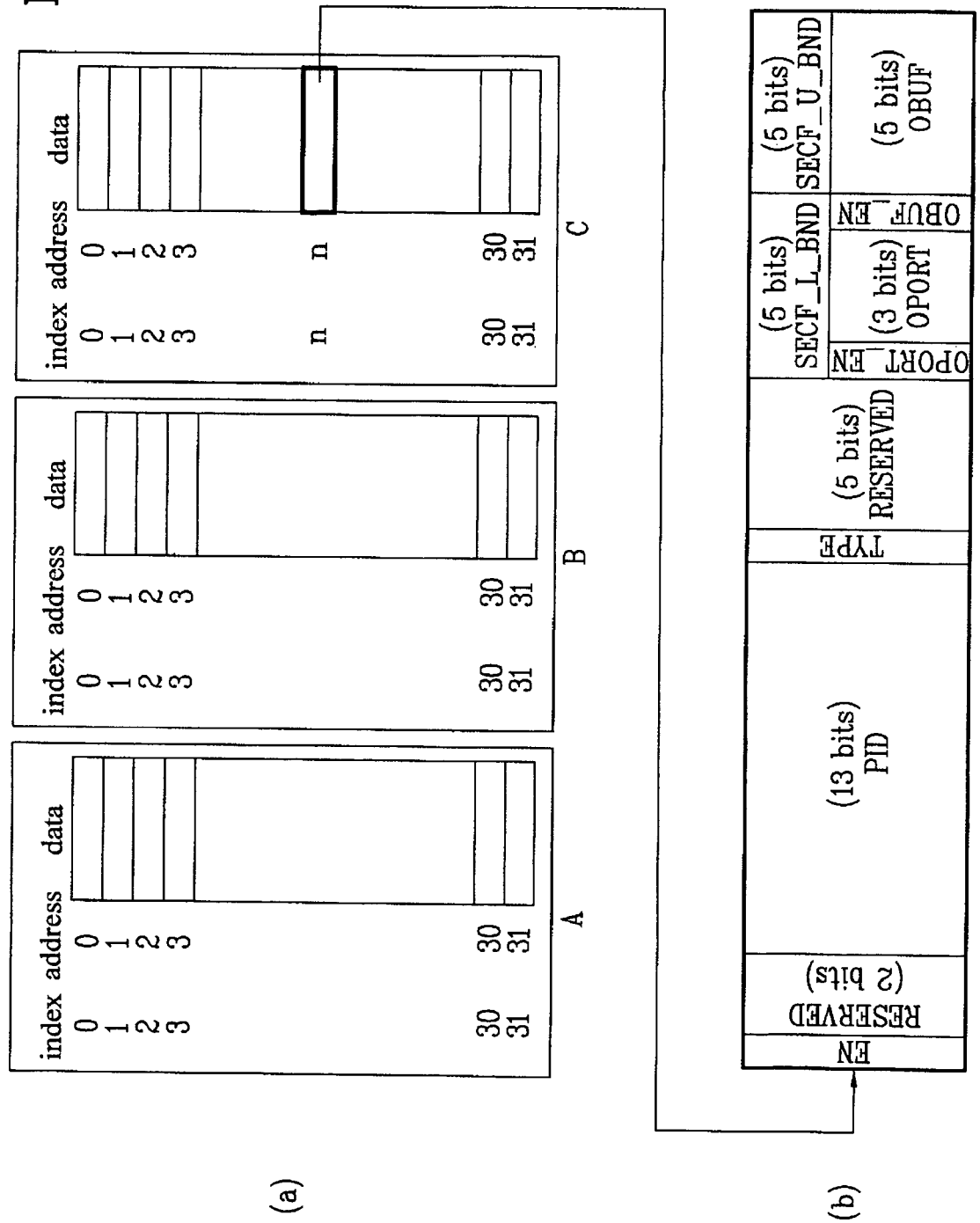
FIG. 3(a) is a view showing an example of a PID filter memory of FIG. 1 providing 32 words per channel.
FIG. 3(b) is a view showing the configuration of the fields of a given word (n) of the PID filter memory of FIG. 3(a)

The PID filter memory 320 searches 32 filters in the example of the conventional method as shown in FIG. 3, while it searches 96 filters in the embodiment of the present invention as shown in FIG. 8. At this point, if PIDF_L_BND and PIDF_U_BND playing the role similar to SECF_L_BND and SECF_UBND are defined for each channel for the PID filter memory 320 and filters to be searched are limited to the filters actually allocated to the corresponding channel, it is possible to prevent the problem of a decrease in speed with an increase of search targets.

In other words, FIG. 8 shows an example of a PID filter according to the present invention. As shown in FIG. 8, memory regions are not allocated in units of channels, but each channel can freely allocate a memory region thereto within the limit of the entire memory capacity.

FIG. 8(b) shows the configuration of the fields of a given word (n) of the PID filter memory. A detailed description of the same parts as FIG. 3(b) is omitted, and only the parts associated with this invention will be described.

In other words, the portions in FIG. 8(b) different from those in FIG. 3(b) include an extension PID field, SECF_L_BND field, SECF_U_BND field, and OBUF field. The extension PID field consists of a 2-bit channel ID and a 13-bit packet ID (PID).

1-bit TYPE field sets whether data of a packet having a PID set for a corresponding address is a section type or PES type.

If data of the packet is a section type, low-order fields operate by 7-bit SECF_L_BND and 7-bit SECF_U_BND. These fields set a lower boundary (i.e., the index of a filter where a search is to be started) and an upper boundary (i.e., the index of a filter where a search is to be finished) when sequentially searching a section filter memory. This increases an operating speed of the section filter by limiting the range of the section filter to be searched to parts. For example, if it is desired to search from a 18-th filter to a 35-th filter, SECF_L_BND is set to '0010010' and SECF_U_BND is set to '0100011'.

Meanwhile if data of the packet is a PES type, lower fields operate by 3-bit OPORT and 7-bit OBUF. If OPORT_EN field is 1, the packet having the PID set for the corresponding address is output to a port set for OPORT field. Further, if OBUF_EN field is 1, the packet having the PID set for the corresponding address is stored in the buffer set for the OBUF field. This buffer is located in the memory connected to the outside of an ASIC.

In the example of FIG. 8, 3 bits and 7 bits are allocated to OPORT and OBUF fields so as to be able to select 8 output ports and 32 external memory buffers.

That is to say, conventionally, 5 bits are allocated for OBUF field because filter memories are separated by channel, and thus buffers can be selected only from 32 buffer regions in each filter memory. In the present invention, however, every filter memory element can select buffers from the whole 96 buffer regions by extensionally allocating 7 bits to OBUF field.

Each of the fields of the PID filter memory as described above are set by software and the PID filter processes a packet according to the settings therefore. For example, a packet of channel A is input into the PID filter, the PID filter sequentially reads the value of an address corresponding to the filter designated by PIDF_L_BND and PIDF_U_BND fields of a corresponding channel ID of the PID filter memory 320, and makes comparison if there is an address having the same extension PID field as the extension PID of a packet currently in process. If there is a matching address, the packet is processed as defined in the values of the rest of the fields set for the corresponding address.

The data processed in the PID processing unit 300 is input into the section processing unit 600 through the descrambler 400 and the buffer 500.

Also in the section filter memory 620, buffer setting memory 630 and state memory 640 of the section processing unit 600, memory regions are not allocated in units of channels but each channel can freely allocate a memory region thereto within the limit of the entire memory capacity. That is, as shown in the example of FIG. 9, in the section filter memory, 32 filters are not used but a desired number of filters are selected from the whole 96 filters without channel discrimination when necessary.

Moreover, the section filter 610 creates and uses an extension table ID by adding a channel ID (CHAN_ID) to a 8-bit table ILD (TBL_ID) defined in the ISO/IEC 13818-1 in order to distinct each section from others. OBUF field is also extended to 7-bits. The channel ID (CHAN_ID) is read from the packet buffer 500 having the structure of FIG. 7 as in the PID filter 310.

Figure 9:
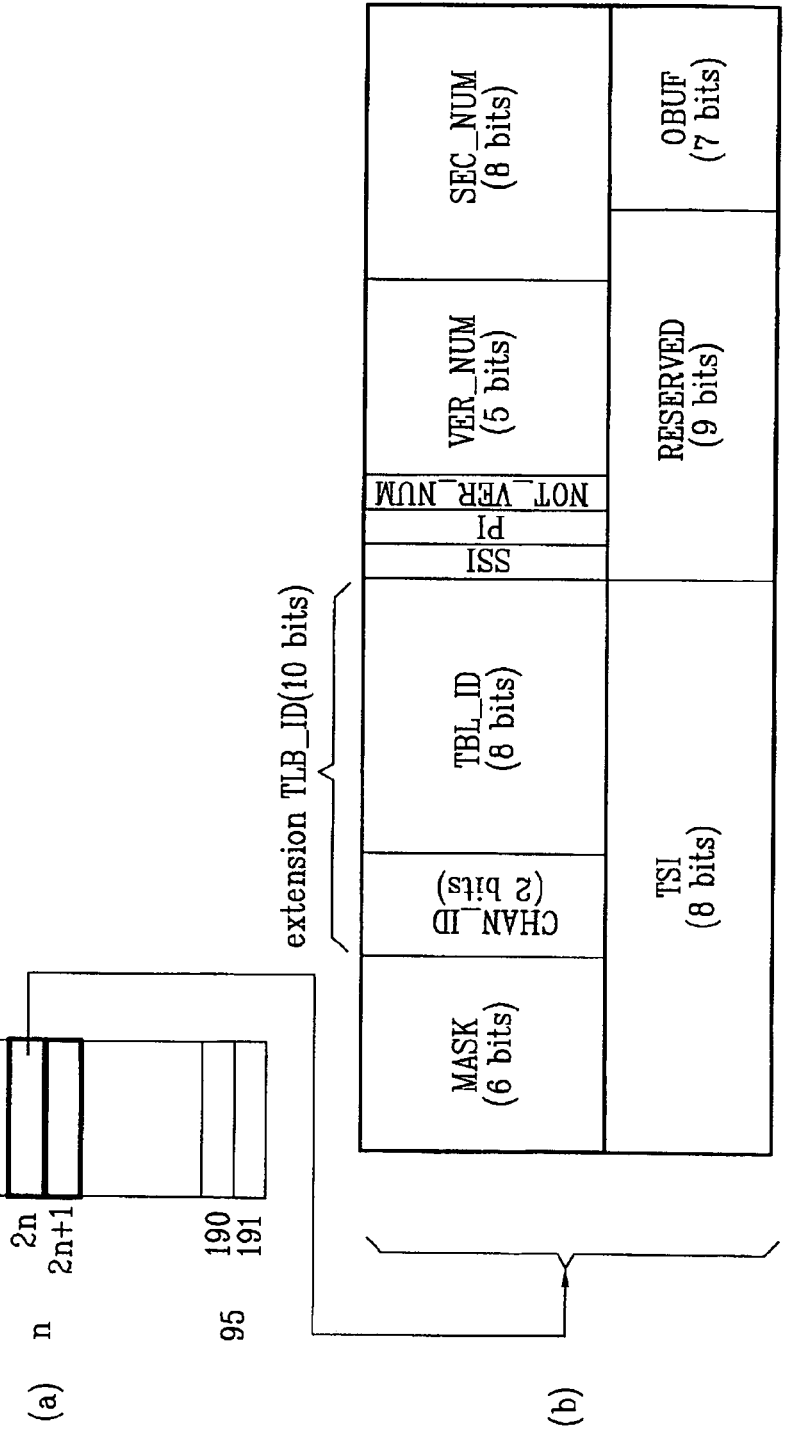
FIG. 9(a) is a view showing an example of a section filter memory without channel discrimination of the system decoder according to the present invention.
FIG. 9(b) is a view showing the configuration of the fields of a given index (n) of the PID filter memory of FIG. 9(a)

FIG. 9 shows an example of a section filter memory according to the present invention. Memory regions are not allocated in units of channels but, as shown in FIG. 9(a), each channel can freely allocate a memory region thereto within the limit of the entire memory capacity.

FIG. 9(b) shows the configuration of the fields of a given index (n) of the PID filter memory. A detailed description of the same parts as FIG. 4(b) is omitted, and only the parts associated with this invention will be described.

In other words, the portions in FIG. 9(b) different from those in FIG. 4(b) include an extension table ID field and OBUF field. The extension table field consists of a 2-bit channel ID (CHAN_ID) and a 8-bit table ID (TBL_ID). The channel ID field is allocated to an unused region between an existing MASK field and the table ID field.

The OBUF field extended from 5 bits to 7 bits designates a buffer for storing a section satisfying the condition. In the example of FIG. 9, one is selected from 96 buffers set for the memory connected to the outside of the ASIC as in the OBUF in the PID filter memory.

Each of the fields of the section filter memory is set by software as in the PID filter memory, and processes a section of a packet input according to the settings therefore. That is, if a condition is set for the section filter memory having 96 memory indexes without channel discrimination, in case that a packet in processing includes a section, the section filter determines whether to take data or not by comparing the value set for the filter memory and the contents of the packet in processing.

At this point, the buffers used for data storage in the PID filter and section filter are all set for the memory connected to the outside of the ASIC. For setting the size and position of these buffers, a register is required, and a buffer setting memory 630 of FIG. 1 plays the role of the register.

Also in the buffer setting memory 630, memory regions are not allocated in units of channels but each channel can freely allocate a memory region thereto within the limit of the entire memory capacity.

Additionally, the section filter requires a state memory 640 for helping the operations of the section filter and decoder besides the section filter memory.

FIG. 10 shows an example of a state memory 640 of the present invention, in which memory regions are not allocated in units of channels but 96 state memory regions corresponding to 96 PID filters are provided without channel discrimination.

Figure 5:
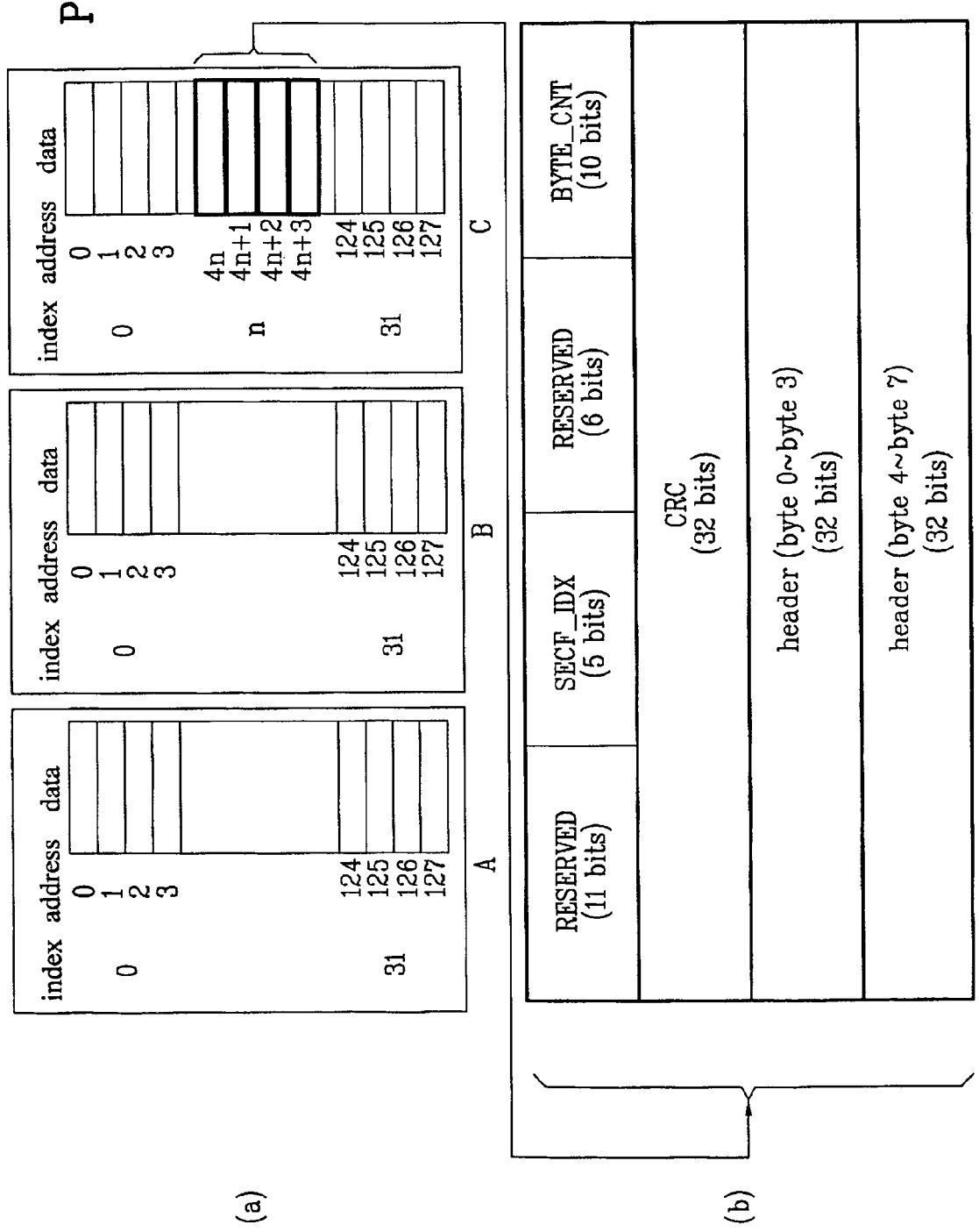
FIG. 5(a) is a view showing an example of a state memory of FIG. 1 providing 32 indexes per channel.
FIG. 5(b) is a view showing the configuration of the fields of a given index (n) of the state memory of FIG. 5(a)

By comparing the state memory of FIG. 10 with the conventional state memory of FIG. 5, it can be seen that SECF_IDX field is extended as CHAN_ID field is.

The SECF_IDX field stores the index of a section filter for processing a section included in a packet having a corresponding PID. At this point, in case the header of the section is stopped at the end of the packet, since the portion continuing in the next packet has no information, such as a table ID or the like, it is impossible to find a proper section filter. This problem can be solved by using SECF_IDX field and the header information after storing them as shown in FIG. 10.

This state information is provided for the case that a section is sent in two packets. Since this case does not occur more than twice for one PID, one unit of state information is allocated per PID filter.

In this way, conventionally, the PID filter memory, section filter memory, buffer setting memory or state memory are all allocated by 32 units per channel and used within this range, while, in the present invention, a number of units is not allocated in advance but the address of each memory is allocated to any channels, which makes it possible to utilize the memory more efficiently.

Moreover, since, in the present invention, data input from a plurality of channels is remultiplexed and processed, some parameters contained in the data are likely to be redundant. For instance, a PID or table ID may have the same value. To solve this problem, as shown in FIGS. 8 and 9, an extension PID and extension table ID with an additional CHAN_ID are used.

In the embodiment of the present invention, three input channels are taken for example. At this time, 2 bits are allocated to the channel I,ID. In this case, even if the number of channels was extended to four, system decoding can be implemented without changing the design of the system decoder or adding an additional circuit.

The terms used in this invention are defined in consideration of the functions according to the present invention. Since such terms can be also modified depending on the intentions or the practices of those skilled in the art, such terms should not be construed in a limiting sense, but should be defined to encompass the overall contents of the present invention.

As the present invention has been described through a preferred embodiment, various other embodiments and changes to the preferred embodiment will be apparent to those skilled in the art and may be made upon considering the technical difficulties of this invention. Therefore, t is obvious that the embodiments and changes quoting the ideas in the above description should not be departed from the scope of the following claims.

As seen from above, the system decoder of a digital TV according to the present invention brings about the effect of remultiplexing packet data input from different channels by giving an ID to each channel, using it as an extension field of a packet ID (PID) and an extension field of a table ID of a section that are defined in the ISO/IEC 13818-1, and storing the channel ID information in the buffer transmitting packets and outputting them. Further, a memory allocated to each component can be operated without channel discrimination through the extension fields and the remultiplexing effect.

In other words, conventionally, every region of each memory required for a PID filter and section filter is divided into a given size and allocated per channel, while, in the present invention, it is determined which channel a corresponding memory address is allocated to by using a channel ID field for the contents of the memory, thus being able to utilize the memory more efficiently.

Also in designing a circuit, there are no particular things to be considered, except that a PID and a table ID are substituted by an extension PID and an extension table ID, and signals provided internally for discriminating channels are read out from the back portion of a packet buffer. Hence, this minimizes the time and cost taken to modify hardware and software so as to apply a PID filter or the like designed in a single channel to a decoder ASIC supporting a plurality of channels.

Moreover, if a system decoder supporting a plurality of input channels is realized according to the structure of this invention, there is no need to modify the interface between the components, which makes it easier to extend the number of channels.

Especially, the present invention can maximize the source utilization efficiency by sharing and time-sharing every source because an input packet data is firstly remultiplexed and then processed in one route.

As seen from the above-description, it will be apparent to those skilled in the art that various changes and modifications can be made within a range not departing from technical idea of the invention.

Thus, the present invention is not limited to the above embodiment, but should be determined with reference to the appended claims.

What is claimed is:

1. A system decoder of a digital TV, comprising:
   a buffer unit simultaneously receiving packet data input from a plurality of channels, giving a channel identifier (ID) to each channel, and temporally storing, time-sharing and outputting the packet data;
   a packet identifier (PID) processing unit consisting of one PID filter shared by a plurality of channels and a PID filter memory, and if there is an extension PID field in the PID filter memory matching with the extension PID field of a packet output from the buffer unit, processing the input packet as defined for the values of the rest of the fields set for a corresponding address; and
   a section processing unit consisting of one section filter shared by a plurality of channels and a section filter memory, and if a packet output from the PID processing unit and in processing contains a section, determining whether to take the input packet or not by comparing an extension table ID field set for the section filter memory and an extension table ID of the packet in processing.

2. The system decoder of claim 1, further comprising: one audio/video (A/V) demultiplexer shared by a plurality of channels, and dividing the packet output from the section processing unit by channel and then dividing the packet of each channel into an audio packet and a video packet and outputting the same.

3. The system decoder of claim 1, wherein the buffer has packet buffers by channel, and the packet data of an input channel, the ID of the channel and the data type information thereof are stored in each packet buffer.

4. The system decoder of claim 3, wherein after extending the back portion of each packet buffer of the buffer unit, 188-bytes effective packet is stored and then a channel ID and data type information are stored in the extended portion.

5. The system decoder of claim 1, wherein the PID filter of the PID processing unit forms an extension PID field by adding a channel LID in front of the most significant bit of the PID field of the packet output from the buffer unit.

6. The system decoder of claim 1, wherein the PID filter memory of the PID processing unit is configured to be freely allocable and available by each channel without channel discrimination within the limit of the entire memory capacity, and the channel ID field is allocated between EN field and PID field for determining whether to apply the settings of a corresponding address, the channel ID field and the PID field forming an extension PID field.

7. The system decoder of claim 6, wherein SECF_L_BND and SECF_U_BND fields among the fields of the PID filter memory of the PID processing unit are extended according to the size of the channel ID field, and the SECF_L_BND and SECF_U_BND fields set a lower boundary and upper boundary of the filter memory for sequentially searching a section filter if the input packet data is a section type.

8. The system decoder of claim 6, wherein OBUF field among the fields of the PID filter memory of the PID processing unit is extended according to the size of the channel ID field, and a packet having the PID set for the corresponding address is stored in the buffer set for the OBUF field if the input packet is a packetized elementary stream (PES) type.

9. The system decoder of claim 8, wherein the buffer is located in the memory connected to the outside of the system decoder.

10. The system decoder of claim 9, wherein the section filter of the section processing unit forms an extension table ID field from a table ID including a section output from the PID processing unit and a channel ID.

11. The system decoder of claim 1, wherein the section filter memory of the section processing unit is configured to be freely allocable and available by each channel without channel discrimination within the limit of the entire memory capacity, and the channel ID field is allocated between MASK field and table ID field for determining whether to use each field of a specific index, the channel ID field and the table ID field forming an extension table ID field.

12. The system decoder of claim 11, wherein OBUF field among the fields of the section filter memory of the section processing unit is extended according to the size of the channel ID field, and a packet having the PID set for the corresponding address is stored in the buffer set for the OBUF field if the input packet is a PES type.

13. The system decoder of claim 1, wherein the section processing unit further comprises a buffer setting memory and a state memory that are freely allocable and available by each channel without channel discrimination within the limit of the entire memory capacity.

14. The system decoder of claim 13, wherein SECF_IDX field among the fields of the state memory is extended according to the size of the channel ID field, the SECF_IDX field storing the index of a section filter where the section included in the packet having the corresponding ID has to be processed.

15. A system decoder of a digital TV, comprising:
a buffer unit simultaneously receiving packet data input from a plurality of channels, giving a channel identifier (ID) to each channel, and temporally storing, time-sharing and outputting the packet data;
a packet identifier (PID) processing unit consisting of one PID filter shared by a plurality of channels and a PID filter memory freely allocable and available by each channel without channel discrimination within the limit of the entire memory capacity, and if there is an extension PID field in the PID filter memory matching with the extension PID field of a packet output from the buffer unit, processing the input packet as defined for the values of the rest of the fields set for a corresponding address;
a section processing unit consisting of one section filter shared by a plurality of channels and a section filter memory freely allocable and available by each channel without channel discrimination within the limit of the entire memory capacity, and if a packet output from the PID processing unit and in processing contains a section, determining whether to take the input packet or not by comparing an extension table ID field set for the section filter memory and an extension table ID of the packet in processing; and
one audio/video (A/V) demultiplexer shared by a plurality of channels, and dividing the packet output from the section processing unit by channel and then dividing the packet of each channel into an audio packet and a video packet and outputting the same.

16. The system decoder of claim 15, wherein the buffer has packet buffers by channel, and after extending the back portion of each packet buffer of the buffer unit, 188-bytes effective packet is stored and then a channel ID and data type information are stored in the extended portion.

17. The system decoder of claim 15, wherein the PID filter of the PID processing unit forms an extension PID field by adding a channel LID in front of the most significant bit of the PID field of the packet output from the buffer unit, and the PID filter memory of the PID processing unit allocates the channel ID field between EN field and PID field for determining whether to apply the settings of a corresponding address, and the channel ID field and the PID field form an extension PID field.

18. The system decoder of claim 17, wherein SECF_L_BND and SECF_U_BND fields among the fields of the PID filter memory of the PID processing unit are extended according to the size of the channel ID field, and the SECF_L_BND and SECF_U_BND fields set a lower boundary and upper boundary of the filter memory for sequentially searching a section filter if the input packet data is a section type.

19. The system decoder of claim 17, wherein OBUF field among the fields of the PID filter memory of the PID processing unit is extended according to the size of the channel ID field, and a packet having the PID set for the corresponding address is stored in the buffer set for the OBUF field if the input packet is a packetized elementary stream (PES) type.

20. The system decoder of claim 19, wherein the one section filter of the section processing unit forms an extension table ID field from a table ID including a section output from the PID processing unit and a channel ID, and the section filter memory of the section processing unit allocates the channel ID field between MASK field and table ID field for determining whether to use each field of a specific index, and the channel ID field and the table ID field form an extension table ID field.

21. The system decoder of claim 20, wherein OBUF field among the fields of the section filter memory of the section processing unit is extended according to the size of the channel ID field, and a packet having the PID set for the corresponding address is stored in the buffer set for the OBUF field if the input packet is a PES type.

22. The system decoder of claim 15, wherein the section processing unit further comprises a buffer setting memory and a state memory that are freely allocable and available by each channel without channel discrimination within the limit of the entire memory capacity.

23. The system decoder of claim 22, wherein SECF_IDX field among the fields of the state memory is extended according to the size of the channel ID field, the SECF_IDX field storing the index of a section filter where the section included in the packet having the corresponding ID has to be processed.

* * * * *